United States Patent
Hasegawa (12)

(10) Patent No.: US 9,992,365 B2
(45) Date of Patent: *Jun. 5, 2018

(54) DOCUMENT DETECTING DEVICE AND DOCUMENT DETECTING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Satoshi Hasegawa, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/622,122

(22) Filed: Jun. 14, 2017

(65) Prior Publication Data

US 2017/0279992 A1  Sep. 28, 2017

Related U.S. Application Data

(63) Continuation of application No. 14/728,006, filed on Jun. 2, 2015, now Pat. No. 9,712,703.

(51) Int. Cl.
*H04N 1/04* (2006.01)
*H04N 1/00* (2006.01)

(52) U.S. Cl.
CPC ..... *H04N 1/00684* (2013.01); *H04N 1/00687* (2013.01); *H04N 1/00729* (2013.01); *H04N 1/00734* (2013.01)

(58) Field of Classification Search
CPC ...................... H04N 1/00684; H04N 1/00729

USPC ................................ 358/488, 486, 497, 474
See application file for complete search history.

(56) References Cited

U.S. PATENT DOCUMENTS

| | | |
|---|---|---|
| 5,511,148 A | 4/1996 | Wellner |
| 5,821,922 A | 10/1998 | Sellers |
| 6,271,935 B1 | 8/2001 | Cook |
| 6,885,479 B1 | 4/2005 | Pilu |
| 8,009,335 B2 | 8/2011 | Honda |
| 8,115,975 B2 | 2/2012 | Shinkawa |
| 8,233,201 B2 | 7/2012 | Toyoda |
| 8,587,843 B2 | 11/2013 | Enami et al. |

(Continued)

FOREIGN PATENT DOCUMENTS

| | | |
|---|---|---|
| CN | 101340502 | 1/2009 |
| JP | 2011-101137 | 5/2011 |

OTHER PUBLICATIONS

Non-Final Office Action for U.S. Appl. No. 14/728,006 dated Apr. 7, 2016, 20 pages.

(Continued)

*Primary Examiner* — Cheukfan Lee
(74) *Attorney, Agent, or Firm* — Amin, Turocy & Watson LLP

(57) ABSTRACT

Certain embodiments provide a document detecting device, including: a plate having an upper surface on which a document is placed; an imaging device that includes the upper surface in a photographing visual field range; and a controller that detects any one or more of a position, an angle, and a size of the document on the upper surface according to an image by the imaging device and fixed-size information of the document stored in advance.

11 Claims, 10 Drawing Sheets

(56) References Cited

U.S. PATENT DOCUMENTS

| | | |
|---|---|---|
| 9,712,703 B2 * | 7/2017 | Hasegawa .......... H04N 1/00684 |
| 2004/0190025 A1 | 9/2004 | Nomura et al. |
| 2005/0207671 A1 | 9/2005 | Saito |
| 2006/0028696 A1 | 2/2006 | Michiie et al. |
| 2008/0278774 A1 | 11/2008 | Enami et al. |
| 2009/0009825 A1 | 1/2009 | Honda |
| 2009/0174916 A1 | 7/2009 | Ootsuka et al. |
| 2009/0323131 A1 | 12/2009 | Toyoda |
| 2010/0060694 A1 | 3/2010 | Saito et al. |
| 2014/0118796 A1 | 5/2014 | Isaev |
| 2015/0116766 A1 | 4/2015 | Oshima |

OTHER PUBLICATIONS

Final Office Action for U.S. Appl. No. 14/728,006 dated Oct. 20, 2016, 13 pages.

* cited by examiner

DOCUMENT DETECTING DEVICE AND DOCUMENT DETECTING METHOD

CROSS-REFERENCE TO RELATED APPLICATIONS

This application is a Continuation of application Ser. No. 14/728,006 filed on Jun. 2, 2015, the entire contents of which are incorporated herein by reference.

FIELD

Embodiments described herein relate generally to a document detecting device and a document detecting method.

BACKGROUND

A copying machine includes a reading device of an image.

According to a size detecting device provided in the copying machine in advance, or an input of a user, the reading device acquires document size information. The reading device reads an image of a document.

In the related art, the reading device includes a surface area within a glass plate as a reading target. The surface area is designated by a movable range of a reading unit such as a carriage.

In the reading device, the premise is that the position and the size of the document match the surface area.

However, the position of the document may not match the designated position. Otherwise, a user may input incorrect document size information.

The reading device cannot accurately perform reading.

The read image deviates from a desired image. In a document having an unfixed size, the reading for an accurate document size cannot be performed.

DETAILED DESCRIPTION

Certain embodiments provide a document detecting device, including: a plate having an upper surface on which a document is placed; an imaging device that includes the upper surface in a photographing visual field range; and a controller that detects any one or more of a position, an angle, and a size of the document on the upper surface according to an image by the imaging device and fixed-size information of the document stored in advance.

Hereinafter, a document detecting device and a document detecting method will be described in detail with reference to the attached drawings. The same reference sign will be given to the same portion in each drawing, and the redundant description will be omitted.

First Embodiment

Figure 1:
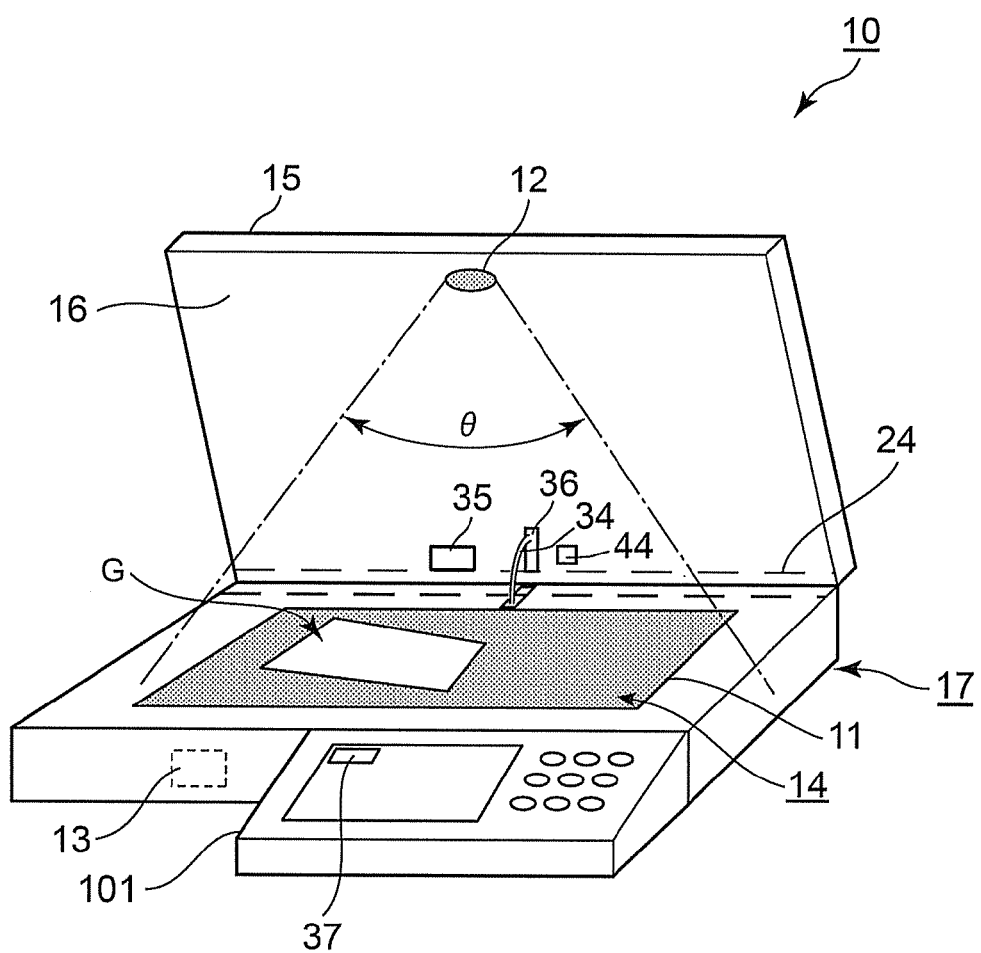
FIG. 1 is a perspective view of a document detecting device according to a first embodiment.

FIG. 1 is a perspective view of a document detecting device according to a first embodiment.

A document detecting device 10 includes a glass plate 11, a camera 12, and a controller 13. A reference sign G indicates a document.

The glass plate 11 includes a glass surface 14 (upper surface) on which the document is placed.

The camera 12 is an imaging device that includes the glass surface 14 in a photographing visual field range.

The controller 13 detects a position, an angle, and a size of the document on the glass surface 14 according to an image photographed by the camera 12 and fixed-size information of the document which is stored in advance.

Figure 2:
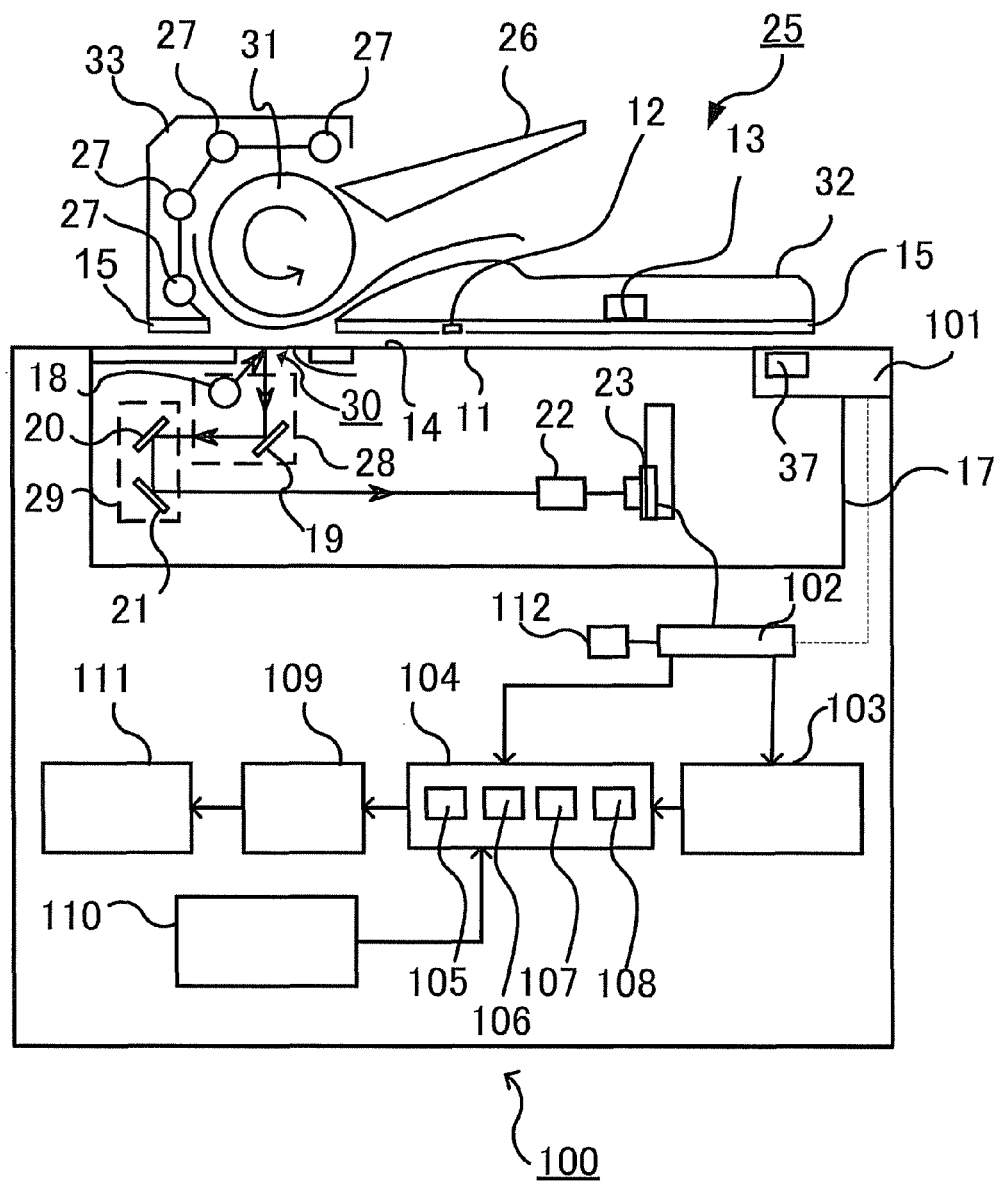
FIG. 2 is a configuration diagram of an image reading device.

FIG. 2 is a configuration diagram of a scanner 17 including the document detecting device 10. FIG. 2 illustrates a copying machine 100.

The scanner 17 is a reading device that reads a document surface of the document.

The glass plate 11 is a platen of the scanner 17. The glass plate 11 is mainly formed of a transparent material. The glass plate 11 transmits light.

The scanner 17 includes a light source 18, mirrors 19, 20, and 21, a lens 22, and a 4-line CCD 23.

The scanner 17 further includes carriages 28 and 29 below the glass plate 11. The carriage 28 fixes the mirror 19. The carriage 29 fixes the mirrors 20 and 21.

The carriages 28 and 29 move in parallel with the glass plate 11. The carriages 28 and 29 receive power for moving from a belt driven by a motor.

The 4-line CCD 23 outputs electric charge information for each color to a page memory 112 of the copying machine 100.

The document detecting device 10 includes the camera 12 in FIG. 1 on a rear surface 16 of a cover 15.

In FIG. 1, the cover 15 has one end on an upper front side, and the other end on a lower depth side. The two ends are laterally parallel with each other.

The cover 15 has a hinge 24 at the other end.

The cover 15 is opened or closed with respect to the glass plate 11 by the hinge 24.

The document detecting device 10 includes the camera 12 at the center of the one end opposite to the other end in the rear surface 16.

A photographing direction of the camera 12 is a direction facing the glass surface 14.

The direction indicates a direction in which the camera 12 can recognize the entirety of the glass surface 14 when the cover 15 is opened at a predetermined angle or larger.

The cover 15 covers the glass surface 14 with the rear surface 16. The rear surface 16 is a protective surface of the glass surface 14. Otherwise, the cover 15 blocks natural light.

The cover 15 is attached to an automatic document feeder (ADF) 25. Otherwise, the ADF 25 may also serve as the cover 15 by using the bottom surface of the ADF 25.

The ADF 25 has the cover 15 at the rear sides of a slope 32 and a main body 33.

The ADF 25 transports a bundle of documents one by one to a reading position. The reading position exists right above a slit 30.

The ADF 25 includes a tray 26, a plurality of rollers 27 having axes that are parallel with each other, a drum 31, the slope 32, and the main body 33.

The ADF 25 forms the slit 30 between a part of the main body 33, the glass plate 11, and the slope 32.

The document detecting device 10 is electrically connected to an operation panel 101 of the copying machine 100 and a controller 102 on the side of the copying machine 100.

The document detecting device 10 of FIG. 1 includes an opening and closing detector 35.

The opening and closing detector 35 detects an open state and a closed state of the cover 15.

The open state indicates a state in which the cover 15 is opened relative to the glass surface 14.

The closed state indicates a state in which the cover 15 is closed relative to the glass surface 14.

For example, a contact switch is used for the opening and closing detector 35.

The document detecting device 10 may include an angle detector 36 and a display 37.

The angle detector 36 detects an opening angle formed between the glass surface 14 and the rear surface 16 of the cover 15.

The angle detector 36 is configured of, for example, a volume resistor 34 and a voltage generation detector 44. One end of the volume resistor 34 is fixed to the rear surface 16 of the cover 15. The other end of the volume resistor 34 is fixed to the glass surface 14.

The voltage generation detector 44 causes a voltage to be generated. The voltage generation detector 44 detects the change of the volume resistor 34 according to the opening angle of the cover 15.

The display 37 may be provided on the operation panel 101 of the copying machine 100. Otherwise, the display 37 may be used in common with a window of the operation panel 101.

Figure 3:
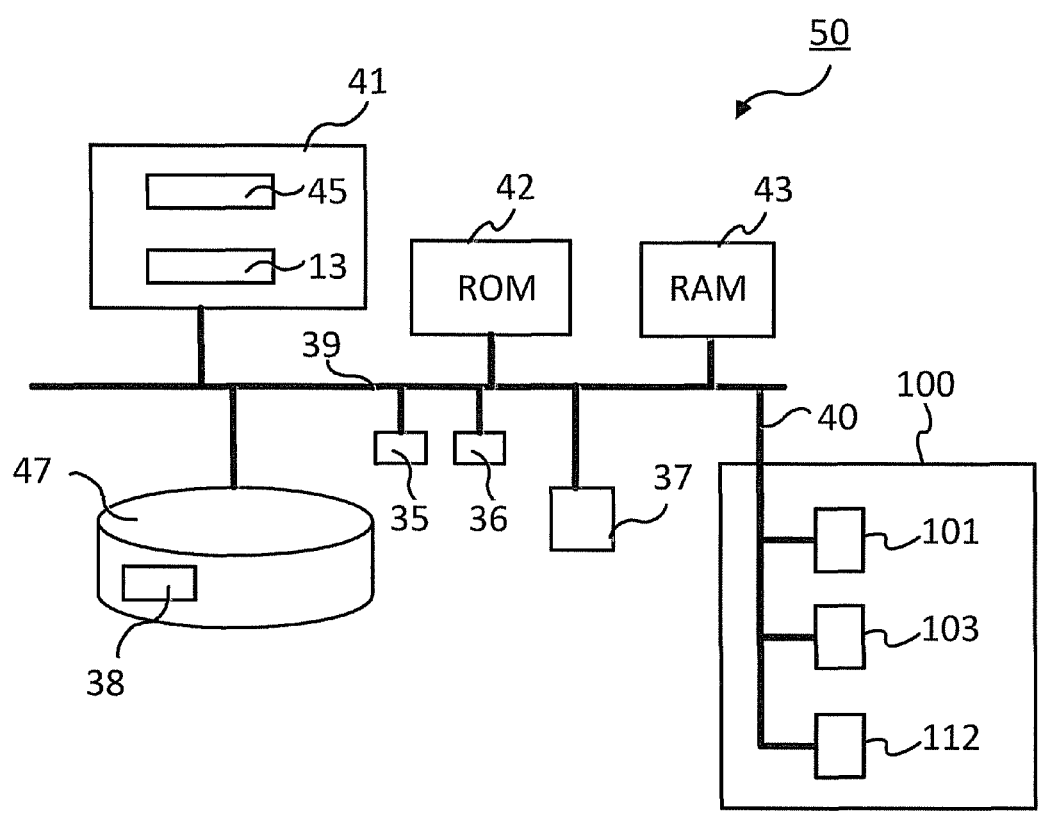
FIG. 3 is a block diagram of a control system.

FIG. 3 is a block diagram of a control system 50 of the document detecting device 10 according to the first embodiment. Reference signs described above represent the same components.

The controller 13 is connected to the opening and closing detector 35, the angle detector 36, the display 37, and a storage unit 38 via a bus 39.

The controller 13 calculates the position, the angle, the size of the document according to the detection of the open state by the opening and closing detector 35.

The controller 13 calculates the position, the angle, and the size by using a memory table or a calculating expression.

The controller 13 causes the display 37 to display a state in which the position, the angle, and the size can be recognized based on an output of the angle detector 36 and the angular range information stored in advance in the storage unit 38.

The document detecting device 10 may be provided with a determination unit 45. The determination unit 45 determines whether the opening angle is within an angular range. The determination unit 45 sends the determination result to the controller 13.

The controller 13 is connected to the operation panel 101 via a bus 40 that is separately provided in the copying machine 100.

The controller 13 allows the operation panel 101 to receive a recognition operation of the position, the angle, or the size based on the output of the angle detector 36 and the angular range information of the storage unit 38.

The controller 13 inputs signals representing buttons and keys from the operation panel 101.

The controller 13 may cause the display 37 to display the completion of the detection of the position, the angle, and the size.

The functions of the controller 13 and the determination unit 45 are executed by a CPU 41, a ROM 42, and a RAM 43.

The CPU 41 is provided on a control substrate in the document detecting device 10.

The ROM 42 stores an application program for calculating the position, the angle, and the size. The ROM 42 may store values necessary for the calculation, a memory table or a calculating expression.

The RAM 43 provides a storage area for work to the CPU 41.

A storage medium 47 is used for the storage unit 38. The storage medium 47 is hard disk drive (HDD) or solid state drive (SSD). The storage unit 38 stores the angular range information.

Further, the storage unit 38 stores an image of the glass surface 14 on which the document is not placed. The scanner 17 photographs the glass surface 14 without a document in advance.

The storage unit 38 stores the fixed-size information of the document. The fixed-size information includes dimensions of a short side and a long side of a sheet.

The fixed-size information is, for example, A4, B4, and A3 of international organization for standardization (ISO) 216.

The fixed-size information is, for example, letter, legal, and ledger.

In addition, the storage unit 38 stores an upper limit angle and a lower limit angle of the angular range.

The upper limit angle is a wide angle at which a part of the glass surface 14 is out of the photographing visual field range.

The lower limit angle is a narrow angle at which a part of the glass surface 14 is out of the photographing visual field range.

In the angular range, the entire region of the glass surface 14 is covered by the photographing visual field range of the camera 12.

The angular range is based on an angle of view for photographing that an image sensor of the camera 12 has. The angular range is based on the attaching position of the camera 12 to the cover 15 and the planar size of the cover 15.

The angular range is determined in advance by a simulation and filed test.

In addition, in FIG. 2, the copying machine 100 includes an image processing unit 103, a printing unit 104, a fixing unit 109, a paper feeding unit 110, a paper discharging unit 111, and a page memory 112.

The image processing unit 103 performs color conversion on image data of three colors of R, G, and B to four printing colors of Y, M, C, and K by using the page memory 112.

The printing unit 104 includes an image forming unit 105 for yellow, an image forming unit 106 for magenta, an image forming unit 107 for cyan, and an image forming unit 108 for black.

The image forming unit 105 for yellow includes a photosensitive drum, a charger that charges the photosensitive drum, and an exposure device that irradiates the photosensitive drum with laser light, which are not illustrated.

Further, the image forming unit 105 includes a developing device that develops an electrostatic latent image and a transfer device that transfers a toner image on a sheet.

The printing unit 104 is supplied with a sheet from the paper feeding unit 110.

The image forming unit 106 for magenta, the image forming unit 107 for cyan, and the image forming unit 108 for black have a configuration substantially the same as that of the image forming unit 105 for yellow.

The fixing unit 109 fixes a toner image on a sheet by a heat roller and a press roller.

The copying machine 100 outputs a sheet from the fixing unit 109 via the paper discharging unit 111.

In addition, the document detecting method according to the embodiment is photographing of an image by the camera 12 in a state where a part between the glass surface 14 and the rear surface 16 of the cover 15 is opened.

The method is detecting of any one or more of the position, the angle, and the size of the document on the glass surface 14 based on the image and the fixed-size information of the document.

In the photographing of an image by the camera 12, a method is detecting of the open state or the closed state of the cover 15 by the opening and closing detector 35.

In the photographing of an image, a method is determining of the determination unit 45 on whether the opening angle by the angle detector 36 is within an angular range by the controller 13.

The operation of the document detecting device 10 will be described.

Figure 4:
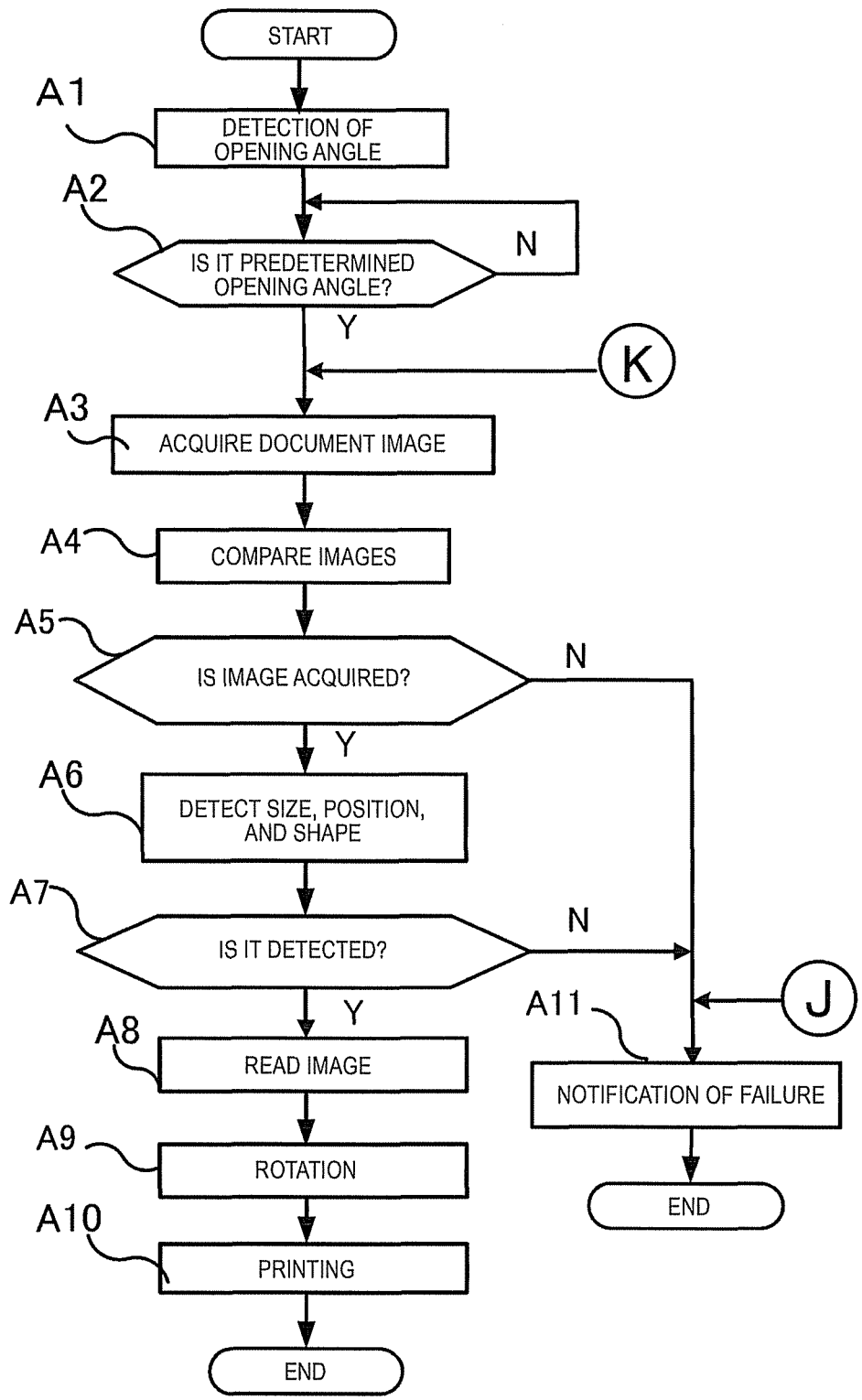
FIG. 4 is a flowchart for describing a detecting process.

FIG. 4 is a flowchart for describing a detecting process of the document detecting device 10.

Figure 5:
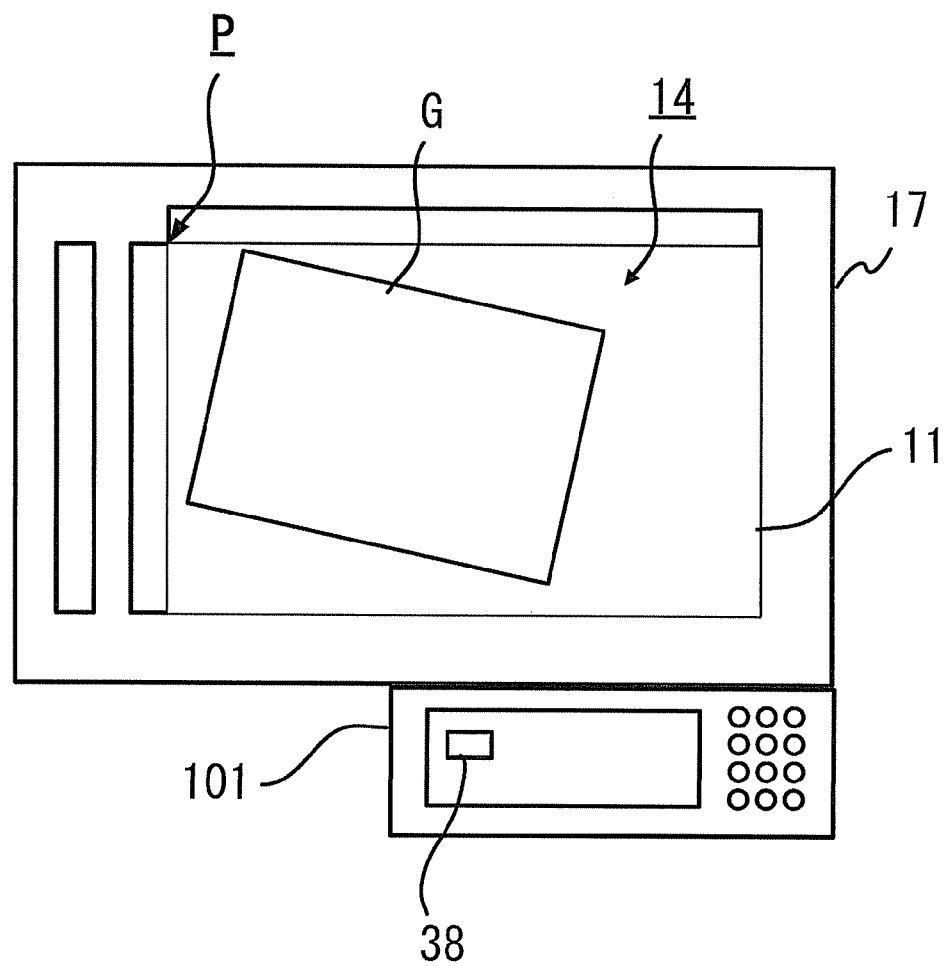
FIG. 5 is a top view of the document detecting device according to the first embodiment.

FIG. 5 is a top view of the document detecting device 10. FIG. 5 illustrates an example in which the cover 15 is removed. Reference signs described above represent the same components.

Before a detecting process starts, a user places a document at an arbitrary position on the glass surface 14.

The position of the cover 15 is set as a fully open position. The fully open position indicates a state in which the cover 15 is erected or almost erected on the glass surface 14.

In Act A1 of FIG. 4, the document detecting device 10 detects the opening angle of the cover 15 by the opening and closing detector 35.

In Act A2, the document detecting device 10 continuously monitors whether or not the opening angle is within the angular range (route N of ACT A2).

In Act A2, the document detecting device 10 compares the opening angle by the angle detector 36 with the angular range information.

In Act A2, the document detecting device 10 detects that the cover 15 has a predetermined angle or less. That is, the document detecting device 10 detects the starting of closing of the cover 15.

In Act A3 through a route Y of Act A2, the document detecting device 10 acquires an image on the glass surface 14. An image at that point in time is acquired.

In Act A4, the document detecting device 10 compares the image of the glass surface 14 without a document, which is stored in advance, with the image acquired by the scanner 17 in a state where the document is placed.

Figure 6:
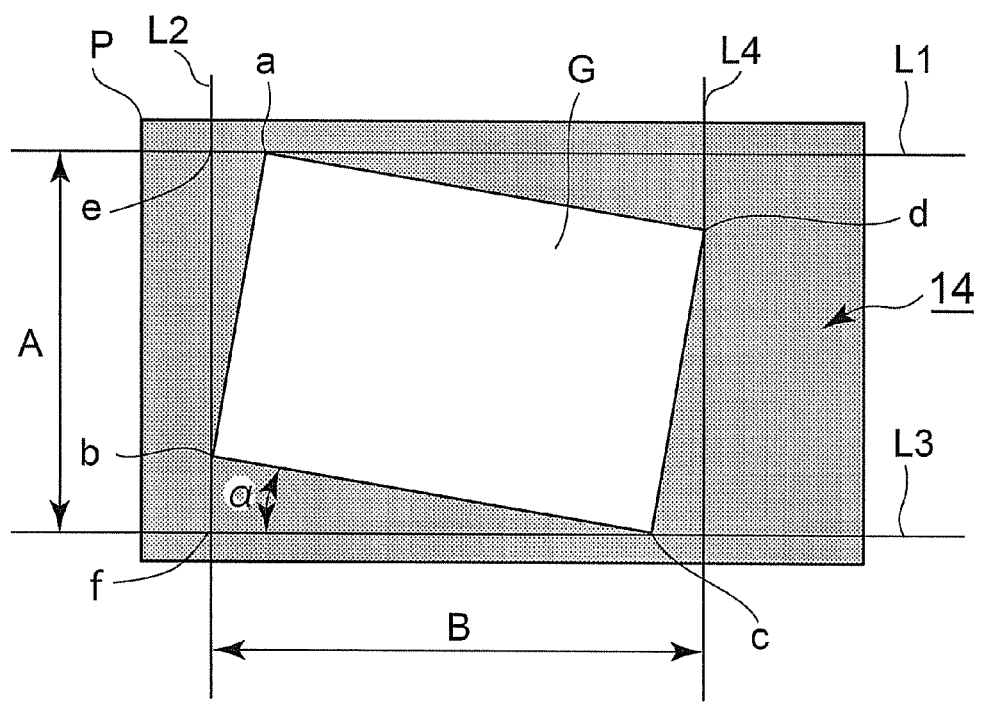
FIG. 6 is a diagram illustrating an example of an acquired image.

FIG. 6 is a diagram illustrating an example of the image acquired by the scanner 17. Reference signs described above represent the same components. FIG. 6 illustrates an example of a state where a document is placed at an arbitrary position on the glass surface 14.

The document detecting device 10 recognizes that the different portion between the images is a portion where a document G is placed.

In Act A5 of FIG. 4, the document detecting device 10 determines whether or not the image is acquired.

In Act A5, if the different portion exists in FIG. 6, the process of the document detecting device 10 proceeds through a route Y, and in Act 6, the document detecting device 10 detects the size, the position, and the inclination amount of the document by the calculation using the image.

Figure 7:
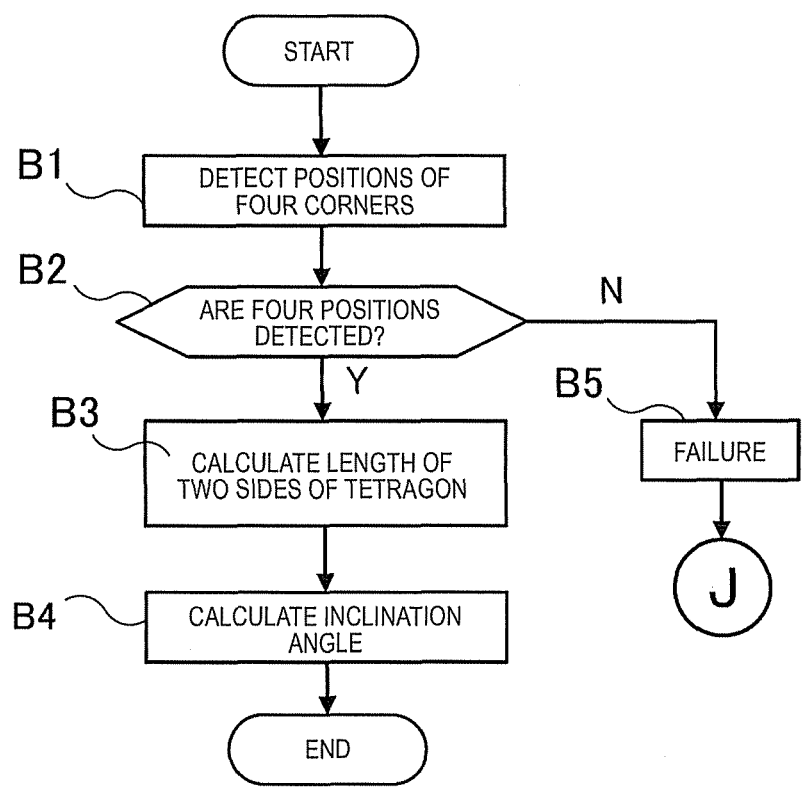
FIG. 7 is a flowchart for describing an example of an inclination correcting process.

FIG. 7 is a flowchart for describing an example of an inclination correcting process by the document detecting device 10.

In Act B1, the document detecting device 10 acquires the positions of four corners of the document as coordinate positions a, b, c, and d. The coordinate sets, for example, an upper left point of the glass surface 14 as a reference point P.

In Act B2, the document detecting device 10 determines whether or not the positions of the four corners are detected. If the four positions are detected, the process proceeds through a route Y of Act B2, and in Act B3, the document detecting device 10 calculates the long side and the short side of a tetragon abcd.

In Act B3, the document detecting device 10 obtains a horizontal line L1 passing through a point a, a vertical line L2 passing through a point b, a horizontal line L3 passing through a point c, and a vertical line L4 passing through a point d.

The document detecting device 10 obtains an intersecting point e of the horizontal line L1 and the vertical line L2, and an intersecting point f of the vertical line L2 and the horizontal line L3.

The document detecting device 10 obtains the length of a side ae by using a triangle abe. The document detecting device 10 obtains the length of a side bf by using a triangle bcf.

Sequentially, in Act B4 of FIG. 7, the document detecting device 10 calculates an inclination angle of the document.

The document detecting device 10 detects the inclination angle by the calculating expression in which one or both of the side ae and the side bf are used.

In Act 7 of FIG. 4, the document detecting device 10 determines whether the size, the position, and the inclination amount of the document are detected. The document detecting device 10 determines the positive or the negative based on, for example, a return value of the process in FIG. 7.

According to the positive result of the process in Act A7, the document detecting device 10 hands over the control to the scanner 17. The document detecting device 10 may transmit the detected information to the scanner 17.

In Act A8, the scanner 17 (FIG. 2) reads the document surface placed on the glass surface 14 by the movement of a reading unit (the light source 18 and the carriages 28 and 29 and the like).

The light source 18 generates light toward the glass surface 14. The mirror 19 guides the reflected light from the document to the mirror 20. The mirror 20 guides the reflected light from the mirror 19 to the mirror 21.

A moving direction of the carriages 28 and 29 is a sub-scanning direction of the document.

The scanner 17 moves the carriages 28 and 29 in a range defined based on the detected information.

The scanner 17 generates an image in a range defined by, for example, a range A and a range B (FIG. 6) on the glass surface 14.

The mirror 21 guides the reflected light from the mirror 20 to the lens 22. The lens 22 collects the reflected light from the mirror 21. The lens 22 forms an image on the surface of the 4-line CCD 23 by using the light.

The 4-line CCD 23 performs photoelectric conversion of light, the image of which is formed for each color. The 4-line CCD 23 stores a charge for each color at a sampling interval.

The scanning of the document by the carriages 28 and 29 is completed. The 4-line CCD 23 outputs intensity information for each color of R, G, and B and brightness information for each color of R, G, and B of the entire document.

The scanner 17 generates image data of a region corresponding to the detected size.

In Act A9, the document detecting device 10 rotates the image based on, for example, the inclination angle obtained by the process of FIG. 7.

In Act A9, the document detecting device 10 selects, for example, the point c as a rotational center. The document detecting device 10 selects a direction in which the inclination angle becomes zero as a rotational direction. The document detecting device 10 converts all pixels by the rotation of an angle α (FIG. 6).

The document detecting device 10 may adjust the vertical position of the image after rotation.

In Act A10, the copying machine 100 transmits the read data to the printing unit 104. The printing unit 104 prints the document on a sheet. The copying machine 100 prints out the sheet.

In addition, in Act A5, if the image is not normally acquired, the process of the document detecting device 10 proceeds through a route N, and in Act A11, the document detecting device 10 sends a control signal to the display 37. The display 37 displays the failure of image acquisition.

The different portion between the images is not detected. Then, the document detecting device 10 causes the display 37 to display that there is no document. The fact that the document is not placed on the glass surface 14 is notified to a user.

The document detecting device 10 may abnormally end the process after Act A11.

In addition, if the size, the position, and the inclination amount of the document are not detected in Act A7, the process proceeds through a route N, and in Act A11, the document detecting device 10 causes the display 37 to display the failure.

In addition, in Act B2 of FIG. 7, if the document detecting device 10 cannot detect the positions of the four corners, the process proceeds through a route N of Act B2, and in Act B5, the document detecting device 10 determines that the detection has failed.

The process of the document detecting device 10 proceeds through a route assigned with J, and the document detecting device 10 causes the display 37 to display the failure of image acquisition (Act A11 of FIG. 4).

For example, it is detected that the document protrudes from the surface area of a detection target on the glass surface 14. For example, it is detected that a part of the document is bent.

The four corners of the document are acquired as the coordinate positions a, b, c, and d, and therefore, the position, the inclination, and the size of the document can be recognized.

It is sufficient for the document detecting device 10 to acquire the image in the range A in the vertical direction, and to acquire the image in the range B in the horizontal direction. In the surface area of the glass surface 14, it is not necessary to read the image in other portions different from the range AB.

The document detecting device 10 extracts only the effective document range from the read image data.

According to the rotation of the angle α, the document detecting device 10 obtains the image data which is the same as image data that is read at a position at which the document is normally set.

According to the document detecting device 10, it is possible to resolve inconvenience of the user to perform positioning of an image surface to be read.

The scanning for reading is sufficient for being performed in the required minimum range AB. Since the scanning is minimally performed, the document detecting device 10 does not use excess power. Therefore, the document detecting device 10 can read the image of the document under necessary and sufficient conditions.

Even if the position of the document does not match the designated position by the reading unit, according to the document detecting device 10, the image can be obtained.

Even if the horizontal direction or the vertical direction of the document does not match the moving direction of the reading device, the document detecting device 10 can obtain the image.

Even if the user erroneously inputs the document size to the operation panel 101, according to the document detecting device 10, the image at an accurate position can be obtained. A desired image is obtained.

Even if a document having an unfixed size is placed on the glass surface 14, according to the document detecting device 10, the image can be read with an accurate size.

Modification Example

In the description above, the document detecting device 10 acquires the image at a point in time when the opened cover 15 starts to be closed.

The image reading timing of the detecting process by the document detecting device according to the first embodiment can be variously modified.

A document detecting device according to a modification example has a configuration substantially the same as the configuration of the document detecting device 10, unless otherwise stated.

A document detecting method according to the modification example is a method in which the determination unit 45 determines whether the opening angle by the angle detector 36 is within the angular range.

According to the positive determination result, the controller 13 causes the display 37 to display a state in which the position, the angle, and the size can be recognized.

According to the positive determination result, the controller 13 may allow the operation panel 101 to receive a recognition operation of the position, the angle, and the size.

Figure 8:
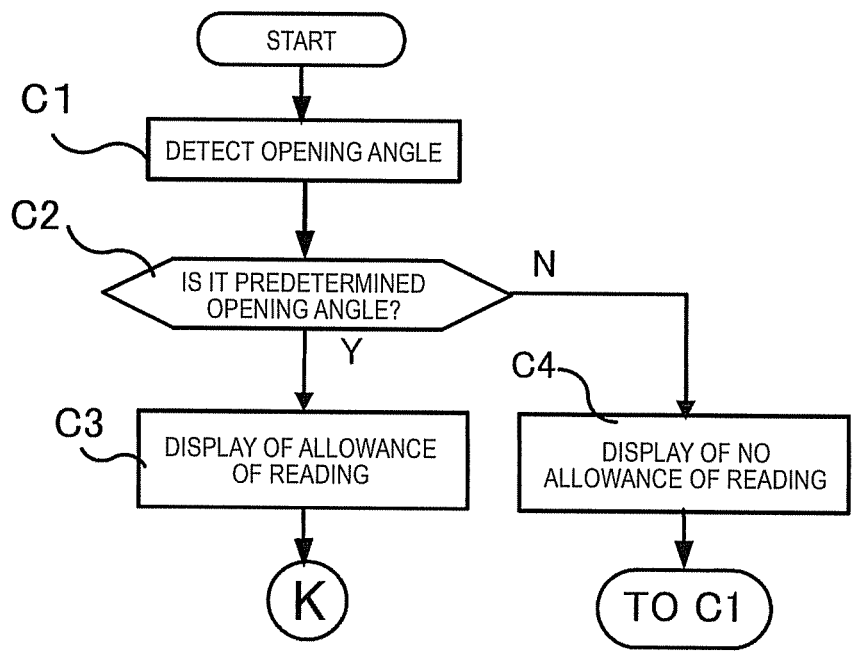
FIG. 8 is a flowchart for describing a detecting process of a document detecting device according to a modification example.

FIG. 8 is a flowchart for describing a detecting process of the document detecting device 10 according to a modification example.

The document detecting device 10 having such a configuration detects the opening angle of the cover 15 (Act C1).

In Act C2, the document detecting device 10 determines whether the cover 15 is within an angular range.

According to the determination result that the cover is within the angular range, the process of the document detecting device 10 proceeds through a route Y to Act C3. The document detecting device 10 causes the display 37 to display that the document detecting device 10 is in a state able to accurately recognize the size, position and shape of the image.

Figure 9A:
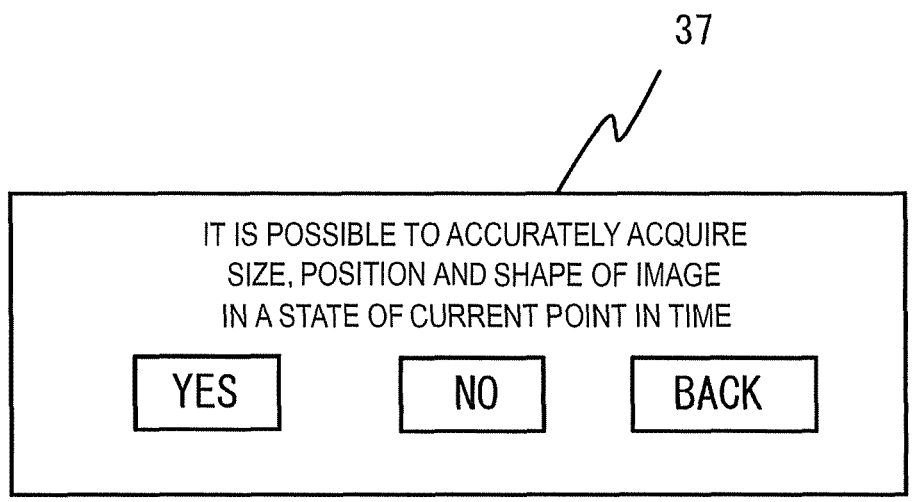
FIG. 9A is a diagram illustrating a display example of a display.

FIG. 9A is a diagram illustrating a display example of the display 37. Reference signs described above represent the same components.

The user is notified that the opening angle of the cover 15 is within the determined range. The user places a document at an arbitrary position on the glass surface 14.

The document detecting device 10 performs processes after Act A3 in FIG. 4 through a route assigned with K in FIG. 8.

In Act C2 in FIG. 8, the document detecting device 10 determines that the opening angle is not within the angular range. For example, the opening angle is small.

The process of the document detecting device 10 proceeds through a route N to Act C4. The document detecting device 10 causes the display 37 to display that the document detecting device 10 is in a state not able to accurately recognize the size, position and shape of the image.

Figure 9B:
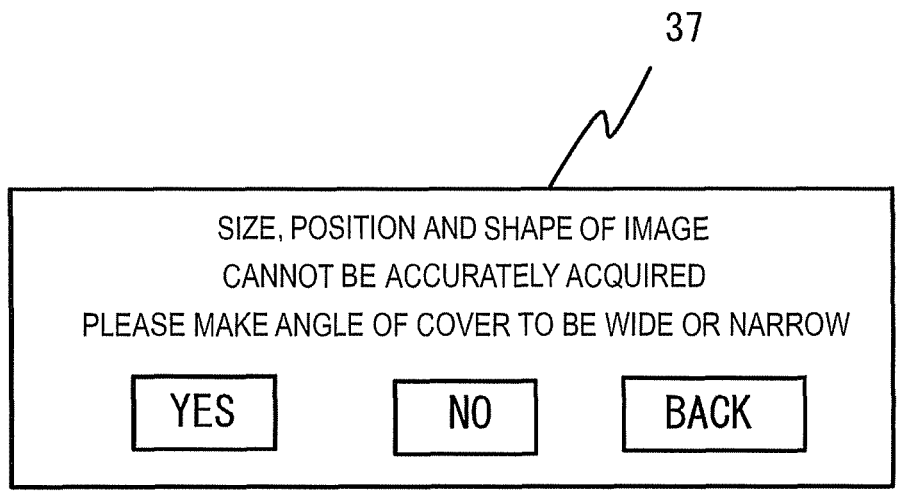
FIG. 9B is a diagram illustrating another display example of the display.

FIG. 9B is a diagram illustrating another display example of the display 37. The user adjusts the opening angle of the cover 15 according to the display by the display 37.

The process of the document detecting device 10 returns to Act C1 from Act C4. If it is detected that the cover 15 is within the angular range, the document detecting device 10 performs the process of Act C3.

In this manner, the document detecting device 10 can accurately obtain an image regardless of the specification of the camera 12 or the attachment position of the camera 12 to the cover 15.

According to the document detecting device of the modification example, there is no limitation on the photographing visual field range. It is possible to generally secure the opening angle of the cover 15.

In addition, if the opening angle is too wide, the document detecting device 10 can guide the user to adjust the opening angle to have more wide angle.

It is possible to prevent the reading failure due to failure of the opening angle.

The document detecting device 10 and the scanner 17 can have a structure in which the opening angle of the cover 15 exceeds 90 degrees with respect to the glass surface 14.

Even if the opening angle is an obtuse angle with respect to the glass surface 14, the user can be guided to make the photographing direction of the camera 12 to be in the photographing visual field range.

Second Embodiment

Figure 10A:
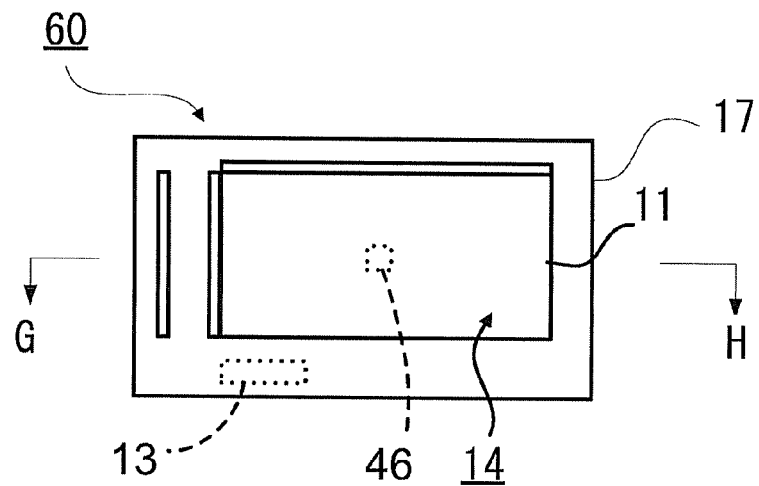
FIG. 10A is a top view of a reading device including a document detecting device according to a second embodiment.

FIG. 10A is a top view of the scanner 17 including a document detecting device according to a second embodiment. FIG. 10A illustrates an example in which the cover 15 is removed.

Figure 10B:
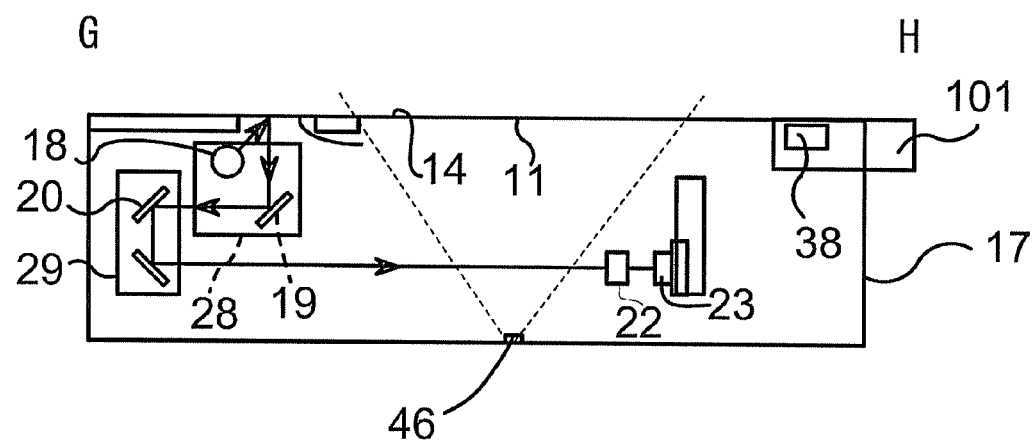
FIG. 10B is a diagram illustrating a vertical cross-sectional structure.

FIG. 10B is a diagram illustrating a vertical cross-sectional structure of the scanner 17. FIG. 10B illustrates an example taken along line GH of FIG. 10A. In FIGS. 10A and 10B, reference signs described above represent the same components.

A document detecting device 60 includes a camera 46 on the inner bottom portion of the scanner 17.

The photographing direction of the camera 46 is a direction facing the rear surface of the glass plate 11.

The photographing visual field range by the camera 46 covers the entire region of the glass surface 14.

Other than those described above, the document detecting device 60 has configuration constituents substantially the same as those of the document detecting device 10.

The document detecting device 60 having such a configuration acquires an image by the detection of the starting of closing of the cover 15.

The document detecting device 60 executes a process substantially the same as the operation example of FIG. 4.

The document detecting device 60 detects the opening angle of the cover 15 (Act A1).

The document detecting device 60 determines whether the opening angle is within the angular range (route N of Act A2).

The document detecting device 60 detects the starting of closing of the cover 15 by the opening and closing detector 35 and the angle detector 36 (route Y of Act A2).

Next, the document detecting device 60 acquires an image (Act A3).

The document detecting device 60 compares the image of the glass surface 14 without a document with the acquired image (Act A4).

The document detecting device 60 determines whether the acquisition of the image succeeds (Act A5).

According to the positive determination result, the document detecting device 60 detects the size, the position, and the inclination amount of the document (Act A6, and Act B1 to Act B4 of FIG. 7).

The document detecting device 60 determines the detection of the size, the position, and the inclination amount of the document succeeds (Act A7).

The scanner 17 scans the document surface (Act A8).

The document detecting device 60 rotates the obtained image (Act A9).

The printing unit 104 prints out the sheet (Act A10).

The document detecting device 60 performs notification of the acquisition failure of the image of the document (Act A11). In a case where information on the position, the size and the inclination amount of the document is not obtained, the document detecting device 60 performs notification of the failure (Act A11).

The document detecting device 60 may cause the display 37 to display a sign indicating the starting of the document acquisition.

In the embodiments described above, the flowcharts of FIGS. 4, 7, and 8 are examples, and the document detecting device 10 is not limited to the examples of the flowcharts. The method of the detecting process can be variously modified.

In the embodiments described above, the document is pressed onto the surface by the rear surface of the cover. The rear surface is not necessary to be normally a plane. For example, the cover may have strip-shaped parallel pieces that are fixed on the rear side of the cover. A plurality of pieces press the document.

In the embodiments described above, the reading unit (the light source 18 and the carriages 28 and 29) is moved in a state where one corner of the document matches the reference point P. However, in the document detecting device 10, the document on the glass surface 14 may match the center of a direction in which the reading unit moves.

Even in an implementation product which is merely implemented by variously modifying the invention, superiority of the document detecting device and the document detecting method is not impaired in any ways.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. A document detecting device comprising:
a plate having an upper surface on which a document is placed, the upper surface having a planar size;
a cover that has a rear surface toward the upper surface, the rear surface having a size that is larger than the planar size;
an automatic document feeder provided over the plate, the automatic document feeder having a bottom surface larger than the planar size;
an imaging device that is provided at any of the rear surface of the cover and the bottom surface of the automatic document feeder and includes the upper surface in a photographing visual field range; and
a controller that determines whether an opening angle which is formed between the upper surface and the bottom surface is within an angular range in which the imaging device recognizes an entirety of the upper surface according to angular range information stored in a memory in advance, the controller detecting one or more of a position, an angle, and a size of the document on the upper surface according to an image by the imaging device and fixed-size information of the document stored in the memory in advance.

2. The device of claim 1, further comprising:
a hinge between the plate and the cover, wherein
the imaging device is provided on the rear surface of the cover.

3. The device of claim 1, further comprising:
an opening and closing detector that detects an open state or a closed state of the automatic document feeder, wherein
the controller starts calculation of the position, the angle, and the size according to the detection of the open state by the opening and closing detector.

4. The device of claim 1, further comprising:
a display, wherein
the controller causes the display to display a state in which the position, the angle, or the size is recognized according to a positive determination result.

5. The device of claim 1, further comprising:
an operation panel, wherein
the controller allows the operation panel to receive a recognition operation of the position, the angle, or the size according to a positive determination result.

6. The device of claim 1, further comprising:
a display, wherein
the controller causes the display to display completion of detecting the position, the angle, and the size according to a positive determination result.

7. A document detecting method comprising:
photographing an image including an upper surface of a plate, the upper surface having a planar size, on the plate
(i) a document being placed,
(ii) a cover having a rear surface toward the upper surface, the rear surface having a size that is larger than the planar size and
(iii) an automatic document feeder being provided over the plate and having a bottom surface larger than the planar size,
in a photographing visual field range by an imaging device provided at any of the rear surface of the cover and the bottom surface of the automatic document feeder, in a state in which a part between the upper surface and the bottom surface of the automatic document feeder is opened;
determining by a controller whether an opening angle, which is formed between the upper surface and the bottom surface, is within an angular range in which the imaging device recognizes an entirety of the upper surface according to angular range information stored in a memory in advance; and
detecting any one or more of a position, an angle, and a size of the document on the upper surface according to the image and fixed-size information of the document stored in the memory in advance.

8. The method of claim 7, wherein
in the photographing of the image,
the image is photographed after an opening and closing detector detects that the automatic document feeder in an open state starts to be closed.

9. The method of claim 7, wherein
in the determining whether the opening angle is within the angular range,
a display is caused to display a state in which the position, the angle, or the size is recognized according to a positive determination result.

10. The method of claim 7, wherein
in the determining whether the opening angle is within the angular range,
an operation panel receives a recognition operation of the position, the angle, or the size according to a positive determination result.

11. An image reading device comprising:
a plate having an upper surface on which a document is placed, the upper surface having a planar size;
a cover that has a rear surface toward the upper surface, the rear surface having a size that is larger than the planar size;
an automatic document feeder provided over the plate, the automatic document feeder having a bottom surface larger than the planar size;
an imaging device that is provided at any of the rear surface of the cover and the bottom surface of the automatic document feeder and includes the upper surface in a photographing visual field range; and
a controller that determines whether an opening angle which is formed between the upper surface and the bottom surface is within an angular range in which the imaging device recognizes an entirety of the upper surface according to angular range information stored in a memory in advance, the controller detecting any one or more of a position, an angle, and a size of the document on the upper surface according to an image by the imaging device and fixed-size information of the document stored in the memory in advance; and a reader that reads the document by a determination result indicative that the opening angle is within the angular range from the controller.

\* \* \* \* \*